(12) United States Patent
Vegter

(10) Patent No.: US 7,804,199 B2
(45) Date of Patent: Sep. 28, 2010

(54) FAIL-SAFE CIRCUIT FOR GAS VALVES

(75) Inventor: Derk Vegter, Amsterdam (NL)

(73) Assignee: Honeywell International Inc., Morristown, NJ (US)

( * ) Notice: Subject to any disclaimer, the term of this patent is extended or adjusted under 35 U.S.C. 154(b) by 762 days.

(21) Appl. No.: 10/599,534

(22) PCT Filed: Mar. 17, 2005

(86) PCT No.: PCT/EP2005/002855

§ 371 (c)(1),
(2), (4) Date: Jun. 26, 2007

(87) PCT Pub. No.: WO2005/098292

PCT Pub. Date: Oct. 20, 2005

(65) Prior Publication Data

US 2008/0042085 A1  Feb. 21, 2008

(30) Foreign Application Priority Data

Apr. 1, 2004  (DE) .................. 10 2004 016 764

(51) Int. Cl.
*H01H 47/20* (2006.01)
(52) U.S. Cl. ..................................... 307/116; 307/126
(58) Field of Classification Search .................. None
See application file for complete search history.

(56) References Cited

U.S. PATENT DOCUMENTS

| 3,715,669 | A |   | 2/1973 | LaForest |
|---|---|---|---|---|
| 4,118,750 | A |   | 10/1978 | Auer et al. |
| 5,865,538 | A |   | 2/1999 | Walker et al. |
| 5,889,645 | A | * | 3/1999 | Kadah et al. ............ 361/191 |
| 5,917,691 | A |   | 6/1999 | Kadah |
| 7,586,213 | B2 | * | 9/2009 | Vegter ..................... 307/116 |

FOREIGN PATENT DOCUMENTS

| DE | 10203765 | 8/2003 |
|---|---|---|
| DE | 102004016764 | 9/2005 |
| EP | 0322899 | 7/1989 |

* cited by examiner

*Primary Examiner*—Stephen W Jackson
*Assistant Examiner*—Adi Amrany
(74) *Attorney, Agent, or Firm*—Crompton Seager & Tufte LLC

(57) ABSTRACT

A fail-safe circuit and fail-safe methods for controlling gas valves are provided. In one illustrative embodiment, a fail-safe circuit includes at least one input that can be connected to a control device and at least one output that can be connected to a gas valve. In some cases, the fail-safe circuit may only supply an output voltage for opening the gas valve if the input signal received from the control device includes at least two different successively applied frequency signals. Other methods and embodiments are also contemplated.

1 Claim, 1 Drawing Sheet

FAIL-SAFE CIRCUIT FOR GAS VALVES

Figure 1:
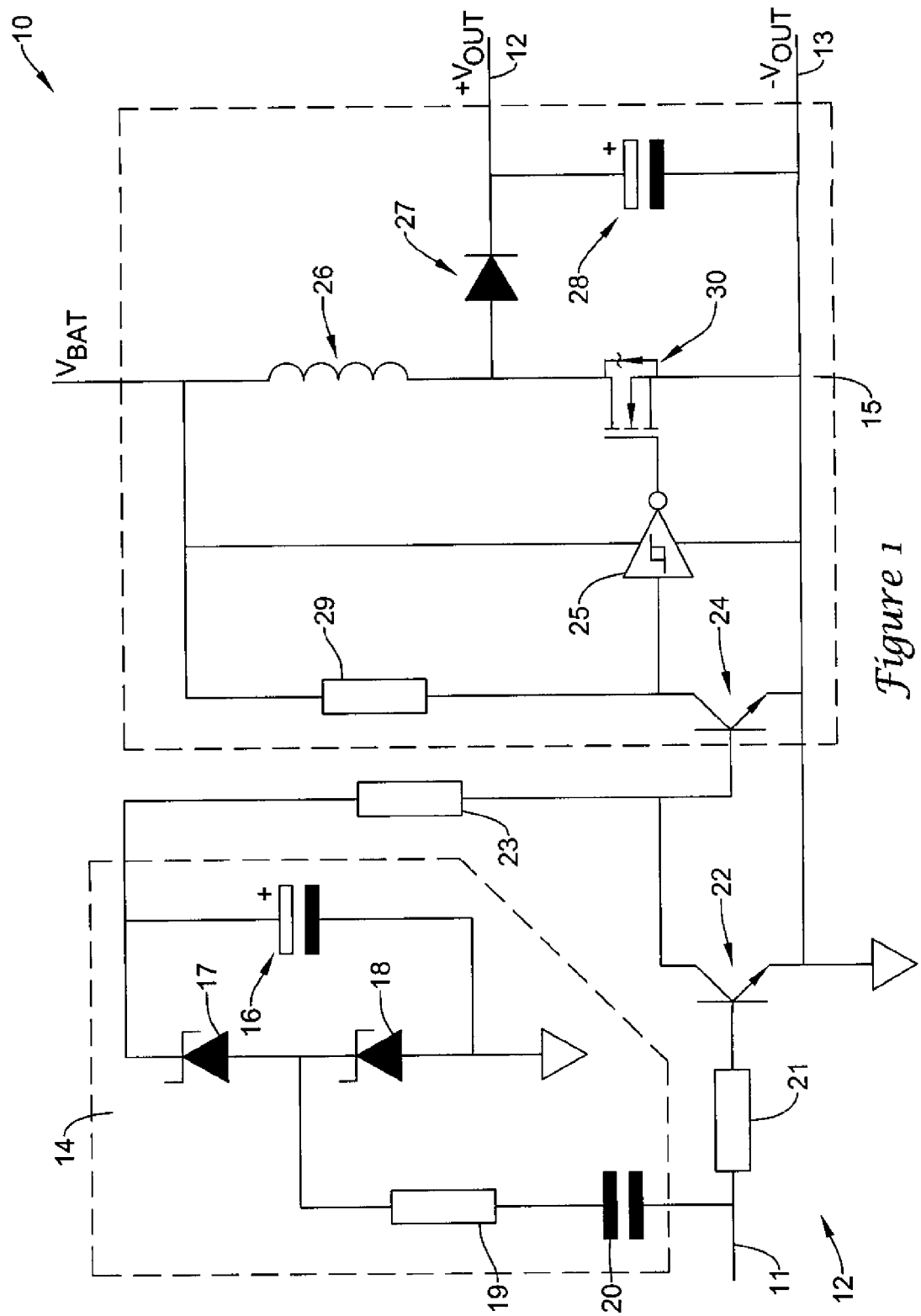

This application claims priority to PCT/EP2005/002855, filed on Mar. 17, 2005, which claims priority to DE102004016764.8 filed on Apr. 1, 2004.

TECHNICAL FIELD

The invention relates to a fail-safe circuit for gas valves.

BACKGROUND

Control devices for gas valves must be fail-safe. If the state of the control device is undefined, then it must be guaranteed that in this undefined state a gas valve controlled by the control device does not open. If, for example, a microprocessor is used as the control device for gas valves, then the use of a fail-safe circuit may help ensure that the whole arrangement is fail-safe.

Recently, piezo-operated gas valves have been used, particularly in low-voltage applications such as water heaters without a mains connection. The piezo-operated gas valves are often controlled by a control device in the form of a microprocessor. In such low-voltage applications, the supply voltage is often approximately 3 volts, which can be provided by a battery. However, a voltage of typically at least 150 volts is required to open the piezo-operated gas valves. Accordingly, a fail-safe circuit is often desirable for low-voltage applications of this kind, which, on the one hand, provides an output voltage of at least 150 volts to open the piezo-operated gas valves from a low supply voltage of approximately 3 volts, and, on the other, only generates the output voltage required to open the piezo-operated gas valves if the control device, often in the form of a microprocessor, is in a defined state to open the gas valves.

SUMMARY

According to one illustrative embodiment the present invention, a fail-safe circuit includes at least one input that can be connected to a control device and at least one output that can be connected to a gas valve, where the fail-safe circuit only supplies an output voltage that is required to open a gas valve to the, or to each output, if an input signal containing at least two different, successive frequency signals is applied by the control device to an input of the fail-safe circuit.

In some cases, a fail-safe circuit is created for gas valves, in particular for piezo-operated gas valves, which, on the one hand, is able to provide an output voltage of more than 150 volts that is required to open piezo-operated gas valves from a supply voltage of only approximately 3 volts, and, on the other, only provides this output voltage required to open the piezo-operated gas valves if the control device is in a defined state to open the gas valves. One illustrative fail-safe circuit may be characterized by a simple design and can be implemented cost-effectively.

According to one illustrative embodiment, the fail-safe circuit may include a charging circuit and a voltage transformer circuit, but this is not required. The charging circuit may have at least one capacitor, where the charging circuit charges the one or more capacitor in the charging circuit when a first frequency signal is applied or is present in the input signal. On the other hand, when a second frequency signal is applied or is present, the one or more capacitors in the charging circuit discharge. In some cases, the voltage transformer circuit produces an output voltage that is required to open the gas valve from a supply voltage when the second frequency signal is applied or is present in the input signal. The voltage transformer circuit may have at least one capacitor, which charges when the second frequency signal is present in the input signal, and which discharges when the first frequency signal is present in the input signal, and hence maintains the output voltage required to open the gas valve more or less unchanged for a period of time.

BRIEF DESCRIPTION

The invention may be more completely understood in consideration of the following detailed description of an illustrative embodiment of the present invention in connection with the accompanying drawings, without being restricted to this or other illustrative embodiment, in which:

FIG. 1 shows a circuit diagram of a fail-safe circuit for gas valves according to one illustrative embodiment of the present invention.

DESCRIPTION

An illustrative embodiment of the present invention is described in greater detail below with reference to FIG. 1.

FIG. 1 shows a fail-safe circuit 10 for gas valves according to one illustrative embodiment, in particular for low-voltage applications. Possible examples of such low-voltage applications are water heaters without a mains connection in which piezo-operated gas valves are used. In such low voltage applications, a supply voltage is typically provided from a battery or from a generator integrated within the water circulation, the supply voltage in such applications is often about 3 volts. In FIG. 1 the supply voltage is identified with $V_{BAT}$.

In the illustrative embodiment of FIG. 1, the fail-safe circuit 10 has an input to which a control device sometimes in the form of a microprocessor can be connected, and two outputs 12 and 13, from which a supply voltage+/−$V_{OUT}$ is output for a gas valve. Depending on the signal from the control device, which is applied to the input 11 of the illustrative fail-safe circuit 10 of FIG. 1, the circuit may generate the output voltage $V_{OUT}$ that is necessary to open the gas valve using the supply voltage $V_{BAT}$, which is approximately 3 volts, namely only when an input signal containing at least two different successive frequency signals is supplied by the control device to the input 11 of the fail-safe circuit 10.

The illustrative fail-safe circuit 10 of FIG. 1 has a charging circuit 14 and a voltage transformer circuit 15. The charging circuit 14 and the voltage transformer circuit 15 contain the components enclosed by chain-dotted lines in FIG. 1.

The charging circuit 14 of the illustrative fail-safe circuit 10 includes a capacitor 16, where two diodes 17 and 18 are connected in parallel with the capacitor 16. A resistor 19, which is connected to the input 11 of the fail-safe circuit 10 via a capacitor 20, is connected between the two diodes 17 and 18.

As can be seen in the illustrative embodiment of FIG. 1, a transistor 22 is connected to the input 11 of the fail-safe circuit 10 via a resistor 21, the transistor 22 being designed as a bipolar transistor, namely as an NPN transistor in the illustrative embodiment. The base of the transistor 22 is connected to the input 11 of the fail-safe circuit 10 by means of the resistor 21. Connected to the capacitor 16 of the charging circuit 14 is a further resistor 23, which in turn is linked to the collector of the transistor 22 and the base of a transistor 24 of the voltage transformer circuit 15. The transistor 24 is in turn designed as a bipolar transistor, namely as an NPN transistor in the illustrative embodiment.

In the illustrative embodiment of FIG. 1, the emitters of the two transistors 22 and 24 are connected together. As well as the transistor 24 already mentioned, the base of which is connected on the one hand to the collector of the transistor 22 and, on the other, by means of the resistor 23 to the capacitor 16 of the charging circuit 14, the voltage transformer circuit 15 furthermore contains a comparator 25, a coil 26, a diode 27, a capacitor 28, a resistor 29 and a further transistor 30. The transistor 30 is designed as a field effect transistor or a MOSFET transistor in the illustrative embodiment.

As can be seen from FIG. 1, the coil 26 is connected on the one hand to the supply voltage $V_{BAT}$ and, on the other, to the so-called drain of the transistor 30, which is designed as a self-blocking field effect transistor in the illustrative embodiment. An anode of the diode 27 is connected between the coil 26 and the drain of the MOSFET transistor 30, whereas the cathode of the diode 27 is connected to the output 12. The source of the MOSFET transistor 30 is shown connected to the output 13, while the capacitor 28 of the voltage transformer circuit 15 is shown connected between the outputs 12 and 13 of the fail-safe circuit 10. As can also be seen from FIG. 1, the output of the comparator 25 connects to the gate of the MOSFET transistor 30 while the input of the same is connected to the collector of the bipolar transistor 25. Furthermore, the collector of the transistor 24 is connected by means of the resistor 29 to the coil 26 and thus to the supply voltage $V_{BAT}$.

As already mentioned, the fail-safe circuit 10 may only generate an output voltage of over 150 volts that is required to open the gas valve at the outputs 12, 13 if a signal containing at least two different successive frequency signals is provided by the control device at the input 11 of the fail-safe circuit 10. In this case, a defined operating state of the control device for opening the gas valve exists.

In the illustrative embodiment, the input signal may contain two frequency signals, namely a first frequency signal with a frequency of about 500 kHz and a second frequency signal with a frequency of about 10 kHz, which are present or are applied successively in the signal provided by the control device in such a way that a time period of about 30 milliseconds with the first frequency signal of about 500 kHz is respectively followed by a time period of about 100 milliseconds with the second frequency signal of about 10 kHz.

The illustrative fail-safe circuit 10 of FIG. 1 may work in such a way that when the first frequency signal of about 500 kHz is applied or is present at input 11, the charging circuit 14 charges the capacitor 16 of the same. While the second frequency signal of about 10 kHz is applied to the input 11, the capacitor 16 of the charging circuit is not charged but rather a discharge of the capacitor 16 takes place via the resistor 23 and the base of the transistor 24. The transistor 24 of the voltage transformer circuit 15 is then conductive if a current flows to its base due to the discharge of the capacitor 16.

During the time period for which the first frequency signal of about 500 kHz is applied to the input 11, a high output voltage that is required to open the gas valve cannot be generated by the voltage transformer circuit 15 due to the high losses, in particular in the coil 26 and in the MOSFET transistor 30 of the voltage transformer circuit 15. Rather, this high output voltage is only generated when the second frequency signal with a frequency of about 10 kHz is applied to the input 11. When the second frequency signal of about 10 kHz is applied to the input 11, an output voltage $V_{OUT}$ of more than 150 volts that is required to open the piezo-operated gas valve is generated from the supply voltage $V_{BAT}$ by the voltage transformer circuit 15, and the capacitor 28 of the voltage transformer circuit 15 is charged.

If a time period of about 100 milliseconds, in which the second frequency signal with a frequency of about 10 kHz is applied, is followed by a time period of about 30 milliseconds with the first frequency signal with a frequency of about 500 kHz, then the capacitor 28 of the voltage transformer circuit 15 discharges and essentially maintains the output voltage of more than 150 volts that is required to open the gas valve. The capacitor 28 discharges via the high resistance of the gas valve during the time period in which the first frequency signal with the frequency of about 500 kHz is applied.

The specific design of the circuit described above is incumbent upon the person skilled in the art addressed here. In the particularly preferred exemplary embodiment in which an output voltage $V_{OUT}$ of about 250 volts is to be provided for opening the gas valve from the supply voltage $V_{BAT}$ of about 3 volts, the capacitance of the capacitor 28 is preferably 1 µF, the capacitance of the capacitor 16 is about 10 µF and the capacitance of the capacitor 20 is about 220 pF. The resistance of the gas valve connected to the outputs 12 and 13 can be assumed to be 10 MΩ, the resistor 21 is preferably chosen to be 1 MΩ, the resistor 19 to be 1 kΩ and the resistor 29 to be 10 kΩ. The resistor 23 preferably has a value of 22 kΩ. The coil 26 preferably has an inductance of 1 mH. With these values, the discharge time of the capacitor 28 is about 10 seconds from which it immediately follows that an output voltage that is required to open the gas valve can also be provided at the outputs 12 and 13 during the time period of 30 milliseconds in which the first frequency signal of about 500 kHz is applied to the input 11.

LIST OF REFERENCES

10 Fail-safe circuit
11 Input
12 Output
13 Output
14 Charging circuit
15 Voltage transformer circuit
16 Capacitor
17 Diode
18 Diode
19 Resistor
20 Capacitor
21 Resistor
22 Transistor
23 Resistor
24 Transistor
25 Comparator
26 Coil
27 Diode
28 Capacitor
29 Resistor
30 Transistor

The invention claimed is:

1. A fail-safe circuit for a gas valve, the fail-safe circuit comprising:
at least one input that can be connected to a control device and at least one output that can be connected to the gas valve, where the fail-safe circuit only supplies an output voltage to open the gas valve to the at least one output if an input signal containing at least two different successive frequency signals is provided by the control device at the at least one input of the fail-safe circuit;
the fail safe circuit comprising:
a charging circuit, which has at least one capacitor, where the charging circuit charges the at least one capacitor of the charging circuit only when a first frequency signal is applied to or is present in the input signal, and wherein the charging circuit does not charge the at least one capacitor in the charging circuit when a second frequency signal is applied to or is present in the input signal, the second frequency signal having a lower frequency than the first frequency signal, and the at least one capacitor in the charging circuit discharges when the second frequency signal is applied to or is present in the input signal;

a voltage transformer circuit, the voltage transformer circuit produces an output voltage to open the gas valve from a supply voltage when the second frequency signal is applied to or is present in the input signal, wherein the voltage transformer circuit has at least one capacitor, which charges when the second frequency signal is present in the input signal, and wherein the at least one capacitor of the voltage transformer circuit continues to provide the output voltage to keep the gas valve open for a period of time when the first frequency signal is applied to or is present in the input signal; and wherein the voltage transformer circuit includes a transistor having a control terminal that is connected via a resistor to the capacitor of the charging circuit, where the transistor of the voltage transformer circuit only conducts when the capacitor of the charging circuit is sufficiently charged by the charging circuit, and the capacitor of the charging circuit discharges as the second frequency signal is applied to or is present in the input signal of the fail-safe circuit.

* * * * *